United States Patent
Galbreath et al.

(10) Patent No.: US 8,662,560 B2
(45) Date of Patent: Mar. 4, 2014

(54) VEHICLE SEATING ATTACHMENT ASSEMBLY

(75) Inventors: Ashford A. Galbreath, Troy, MI (US); Asad S. Ali, Troy, MI (US)

(73) Assignee: Lear Corporation, Southfield, MI (US)

( * ) Notice: Subject to any disclaimer, the term of this patent is extended or adjusted under 35 U.S.C. 154(b) by 103 days.

(21) Appl. No.: 12/509,656

(22) Filed: Jul. 27, 2009

(65) Prior Publication Data

US 2011/0018300 A1   Jan. 27, 2011

(51) Int. Cl.
*B60N 2/015* (2006.01)
*B60N 2/44* (2006.01)

(52) U.S. Cl.
USPC .............. 296/63; 297/452.27; 297/218.5

(58) Field of Classification Search
USPC .................. 296/63; 297/452.27, 218.5
See application file for complete search history.

(56) References Cited

U.S. PATENT DOCUMENTS

| | | | |
|---|---|---|---|
| 588,244 A | 8/1897 | Roberts | |
| 2,073,872 A | 3/1937 | Kliesrath | |
| 2,411,412 A | 11/1946 | Blair et al. | |
| 3,833,259 A | 9/1974 | Pershing | |
| 4,552,406 A | 11/1985 | Ohl | |
| 4,755,411 A | 7/1988 | Wing et al. | |
| 4,757,854 A | 7/1988 | Rippberger | |
| 4,852,228 A | 8/1989 | Zeilinger | |
| 4,861,104 A | 8/1989 | Malak | |
| 4,971,379 A * | 11/1990 | Rumpel et al. .............. 296/63 |
| 5,400,490 A | 3/1995 | Burchi | |
| 5,542,747 A | 8/1996 | Burchi | |
| 5,700,058 A | 12/1997 | Balagurumurthy et al. | |
| 5,786,394 A | 7/1998 | Slaven | |
| 5,827,547 A | 10/1998 | Burchi et al. | |
| 5,882,073 A | 3/1999 | Burchi et al. | |
| 5,971,478 A | 10/1999 | Hurite | |
| 6,406,093 B1 | 6/2002 | Miotto et al. | |
| 6,540,295 B1 | 4/2003 | Saberan et al. | |
| 6,609,745 B2 | 8/2003 | Miyahara et al. | |
| 6,612,648 B1 | 9/2003 | Hashiguchi | |
| 6,838,155 B2 | 1/2005 | Cappucci et al. | |
| 6,899,399 B2 | 5/2005 | Ali et al. | |
| 7,134,730 B2 | 11/2006 | Flegal et al. | |
| 7,195,277 B2 | 3/2007 | Tracht et al. | |
| 2003/0162008 A1 | 8/2003 | Cappucci et al. | |
| 2003/0215601 A1 | 11/2003 | Pedde et al. | |
| 2004/0084937 A1 | 5/2004 | Berta | |
| 2007/0035165 A1 | 2/2007 | Zahel | |
| 2008/0018162 A1 * | 1/2008 | Galbreath et al. ....... 297/452.48 |
| 2008/0048474 A1 | 2/2008 | Pedde et al. | |

FOREIGN PATENT DOCUMENTS

| | | |
|---|---|---|
| DE | 2 153 069 A1 | 5/1975 |
| DE | 32 07 352 A1 | 9/1983 |
| DE | 299 10 294 U1 | 8/1999 |
| DE | 100 12 034 A1 | 9/2001 |
| DE | 103 26 241 A1 | 12/2004 |
| DE | 10 2005 057 418 A1 | 7/2006 |
| DE | 20 2006 019 999 U1 | 7/2007 |

OTHER PUBLICATIONS

German Office Action Dated Apr. 12, 2011, Applicant Lear Corporation, Application No. 10 2010 028 204.9-16, 4 Pages.

* cited by examiner

*Primary Examiner* — Glenn Dayoan
*Assistant Examiner* — Melissa A Black
(74) *Attorney, Agent, or Firm* — Brooks Kushman P.C.

(57) ABSTRACT

The present invention relates to a vehicle seat assembly securable to a floor pan. In at least one embodiment, the vehicle seat assembly comprises a seat bottom supportable on the floor pan and a trim cover securable over the seat bottom and to the floor pan.

20 Claims, 4 Drawing Sheets

VEHICLE SEATING ATTACHMENT ASSEMBLY

BACKGROUND OF THE INVENTION

1. Field of the Invention

The present invention relates to a vehicle seat attachment.

2. Background Art

Most vehicles have a second, and in some case, a third row of seat assemblies. Conventional vehicle seat assemblies typically involve the use of a metal frame and wires for securing the seating assembly to the vehicle. This can add weight and complexity to the manufacturing process.

Accordingly, there is a need to provide a vehicle seat assembly which is structurally sound and comfortable, yet lighter and easier to manufacture than typical seat assemblies.

SUMMARY OF THE INVENTION

According to at least one aspect of the present invention, a vehicle seat assembly is provided. The vehicle seat assembly is securable to a floor pan having at least one attachment receptacle. In at least one embodiment, the vehicle seat assembly comprises a seat bottom supportable on the floor pan and a trim cover securable over the seat bottom and to the floor pan.

In at least one embodiment, the trim cover has a first attachment bracket securable to a first attachment receptacle of the floor pan. In at least a further embodiment, the trim cover has a second attachment bracket securable to a second attachment receptacle of the floor pan, with the first attachment bracket being disposed on a front end of the trim cover and the second attachment bracket being disposed on a rear end of the trim cover.

In yet another embodiment, the first and second attachment brackets are sized to provide an interference fit with first and second attachment receptacles, respectively.

According to at least another aspect of the present invention, a vehicle seat assembly trim component for use with a seat bottom supportable on a floor pan is provided. In at least one embodiment, the vehicle seat assembly trim component comprises a textile cover securable over the seat bottom and to the floor pan.

According to at least another aspect of the present invention, a method of securing a vehicle seat assembly to a floor pan is provided. In at least one embodiment, the method of securing a vehicle seat assembly to a floor panel comprises providing a seat bottom, disposing a trim cover over the seat bottom, supporting the seat bottom on the floor pan, and securing the trim cover to the floor pan.

In at least one embodiment, the seat bottom comprises a seat frame made of a structural foam and a cushion supported on the frame. In yet a further embodiment, the structural foam comprises expanded polyolefin.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

Figure 1:
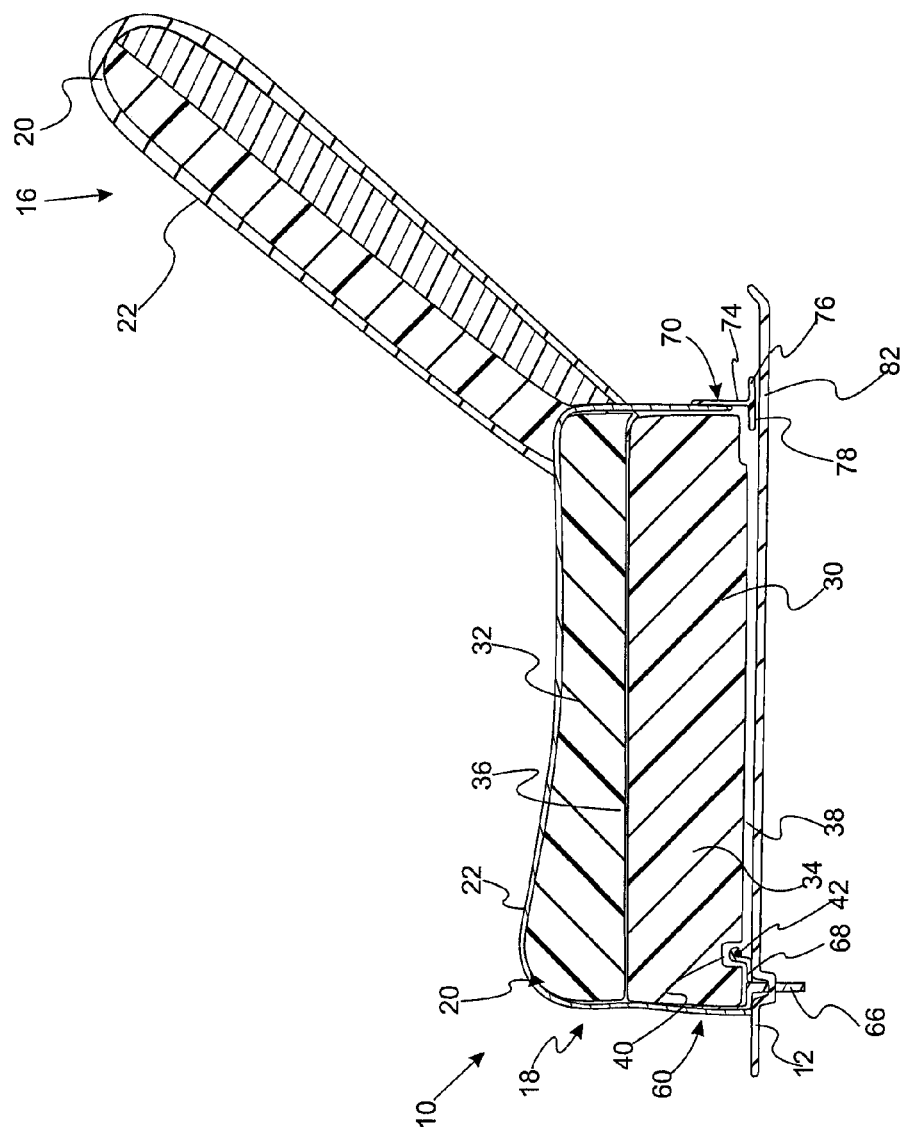
FIG. 1 is a schematic cross-sectional side view of a vehicle seat assembly employing the use of an attachment assembly in accordance with an embodiment of the present invention.
Figure 2:
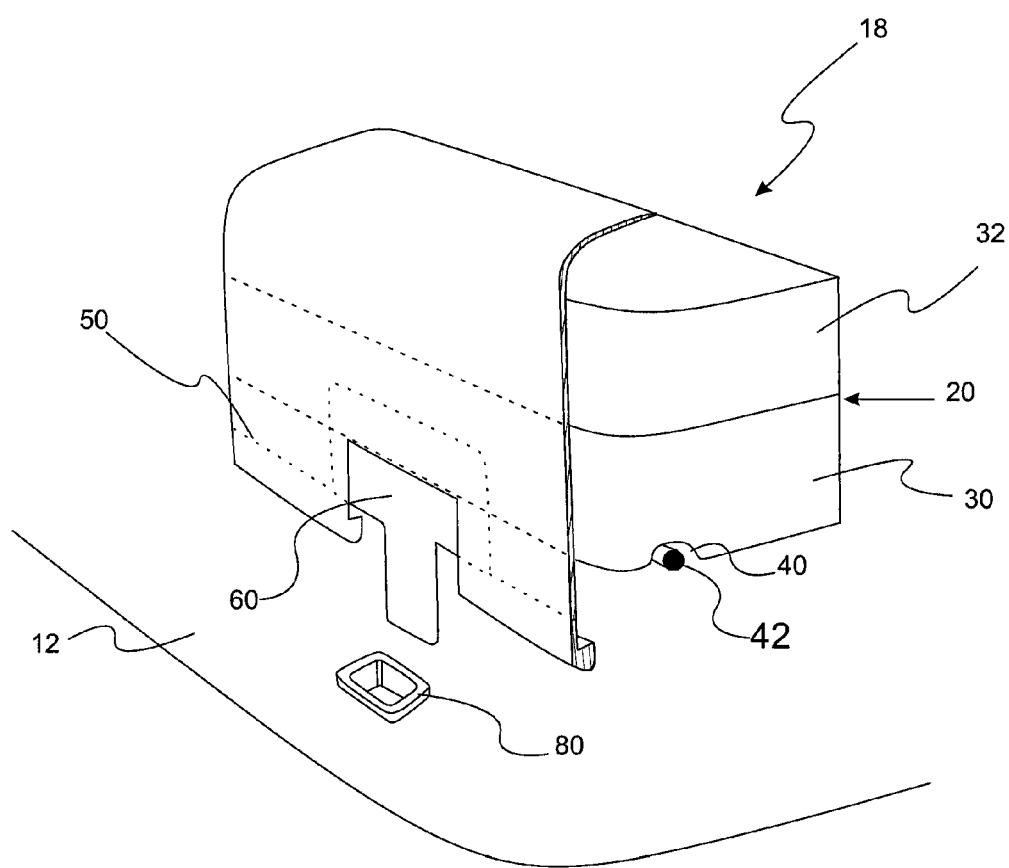
FIG. 2 is a schematic exploded perspective view of a portion of the vehicle seat assembly illustrated in FIG. 1.
Figure 3:
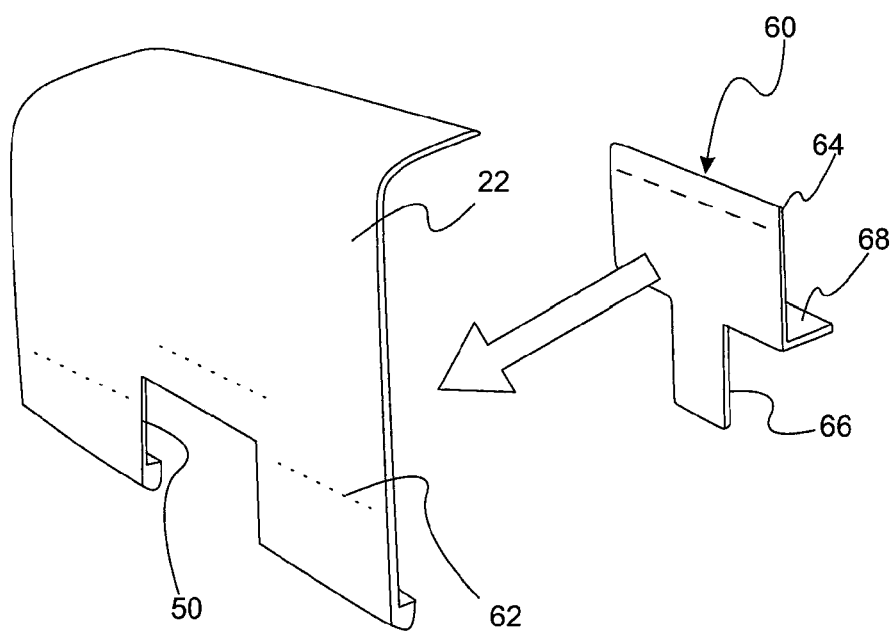
FIG. 3 is a schematic exploded perspective view of components of the vehicle seat assembly illustrated in FIG. 1.

Referring now to the Figures, where like numerals are used to designate like structures throughout the drawings, a schematic vehicle seat assembly in accordance with at least one embodiment of the present invention is generally shown at 10 in FIG. 1. While the vehicle seat assembly 10 is illustrated in FIG. 1 to be a rear bucket seat assembly, it should be understood that the principles of the invention are applicable to other types of seat assemblies, such as bench, captain and other types of seat assemblies. Moreover, it should be understood that the principles of this invention are also applicable to other seat rows, such as the front and third rows of seats. It should also be understood that the principles of the present invention are applicable to other configurations where foam is a component such as backrests. Still further, it should also be understood that the principles of this invention are applicable to all types of vehicle seat assemblies as well as non-vehicle seat assemblies.

As shown in FIG. 1, the vehicle seat assembly 10 is supported on a vehicle floor pan 12. The vehicle seat assembly 10 may be secured in any suitable manner to the floor pan 12. In certain embodiments, the vehicle seat assembly 10 may be secured to parts of the vehicle other than, or in addition to, the floor pan, such as a vehicle body frame (not shown) and/or other interior components, such as a center console or a rear package tray.

The illustrated vehicle seat assembly 10 includes a seat back, generally indicated at 16, and a lower seat assembly, generally indicated at 18. In at least the illustrated embodiment, the seat back 16 and the lower seat assembly 18 each have a cushion composite 20 covered by a trim material 22. As can best be seen in FIG. 1, in the illustrated embodiment, the cushion composite 20 includes a structural polymeric frame 30 and a cushion 32 that is disposed over the structural frame 30.

In the illustrated embodiment, the cushion composite 20 in both the seat back 16 and the lower seat assembly 18 are made of generally the same construction. However, it should be understood that the cushion composite 20 for the seat back 16 can differ from the cushion composite 20 of the lower seat assembly 18. Likewise, it should be understood that the trim material 22 for the seat back 16 can differ from the trim material 22 for the lower seat assembly 18. Moreover, while in at least one embodiment of the invention, the structural frame 30 must be made of structural foam, in other embodiments, the structural polymeric frame 30 could be replaced with a more conventional seat frame, such as those that are stamped or welded out of suitable metals such as aluminum, steel or other metal alloys.

The cushion composite 20 may optionally include a comfort pad (not shown) that is disposed over the cushion 32. As will be explained further below, in at least one embodiment, each of the frame member 30, the cushion 32 and, if present, the optional comfort pad, cooperate with, and in some embodiments are secured to, each other in a manner such that they are relatively easily separable for recycling at end of use. If any of the frame 30, the cushion 32, and optional comfort pad are secured to another, suitable securement methods can be used, such as the use of interference fits, surface tension resistance modifications, clips and/or adhesive, in such a manner as to allow for relatively easy separation of the components.

The frame 30 has a main body portion 34 having an upper surface 36 and a lower surface 38. In at least one embodiment, the main body portion 34 has an average thickness of 20 to 400 mm, a length of 400 to 1400 mm and a width of 300 to 600 mm. In at least the illustrated embodiment, the frame 30 includes a recess 40 adjacent the lower front surface 38 of the main body portion 34. In at least one embodiment, the recess 40 has a depth of 20 to 40 mm and a width of 12 to 40 mm. The recess 40 may extend across the lower surface 38 of the main body portion 34 from side to side, or only extend a short distance, such as 10 to 25 mm. Moreover, one or more recesses 40 can be provided. For instance, in one embodiment, the lower surface 38 has two recesses 40, with each recess 40 being spaced 10 to 20 mm from its respective side edge of the main body portion 34 and 15 to 30 mm from the front edge of the body 34. However, it should be understood that the numbers, locations, sizes and shapes of the recess(es) 40 can vary as desired.

The structural frame 30 can be made of any suitable structural foam material. In at least one embodiment, suitable structural materials will have a rigidity and/or density that is higher than conventional polyurethane foam. For instance, the structural foam may have a density that is in one embodiment, 50% to 300% higher than that of conventional polyurethane foam, and in other embodiments that is 150% to 225% higher than that of conventional polyurethane foam. In at least one embodiment, suitable structural foam materials have a density of at least 1.0 pounds per cubic foot (pcf), and less than 6.0 pcf, and in other embodiments of 1.75 to 4.5 pcf. Density of the structural foam material can be measured in accordance with ASTM test method No. D3574.

In at least one embodiment, suitable structural materials will have a hardness of 150 to 250 N/mm$^2$, in at least another embodiment of 175 to 230 N/mm$^2$, and in at least another embodiment of 190 to 215 N/mm$^2$. Hardness can be measured by ASTM test method No. D3574 and at 25% compression or deflection. In at least one embodiment, suitable structural materials will have a compression strength of 20 to 100 psi, in at least another embodiment of 30 to 80 psi, and in at least another embodiment of 35 to 65 psi, as measured in accordance with ASTM test method No. D3574.

Density, compressive strength (at 75% strain) and hardness can all be measured in accordance with ASTM test method No. D3574. Flexural strength can be measured in accordance with ASTM test method No. D790.

In at least one embodiment, the structural frame 30 comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, blends thereof and the like.

In at least one particular preferred embodiment, the EPO is expanded polypropylene (EPP) and its copolymers with ethylene, propylene and butylene. Any suitable EPP may be used, however in at least one embodiment, suitable EPPs include, but are not limited to, ARPRO® EPP available from JSP International and EPP available from Kaneka.

Expanded polyolefins can be prepared by an expanded bead forming process in which relatively small uniform beads of polymer are produced, containing a gas which is utilized to effect blowing during the forming process. The most commonly used gas is air although other gases including low boiling point liquids which produce gases at the molding temperatures may be used. Suitable gases include, but are not limited to air, nitrogen, carbon dioxide, pentene and the like.

Figure 4:
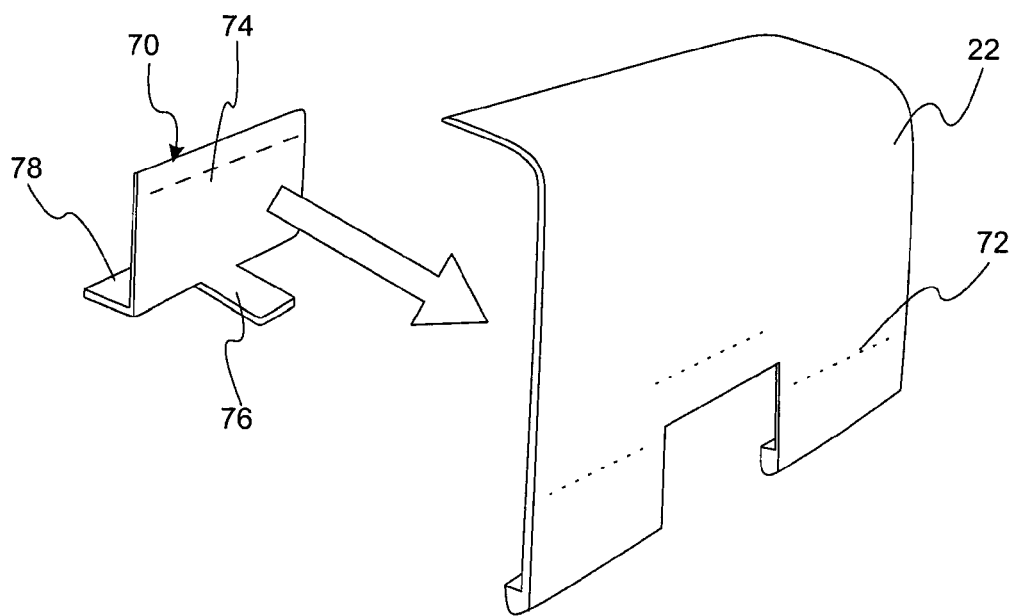
FIG. 4 is a view similar to FIG. 3, illustrating different components of the vehicle seat assembly illustrated in FIG. 1.
Figure 5:
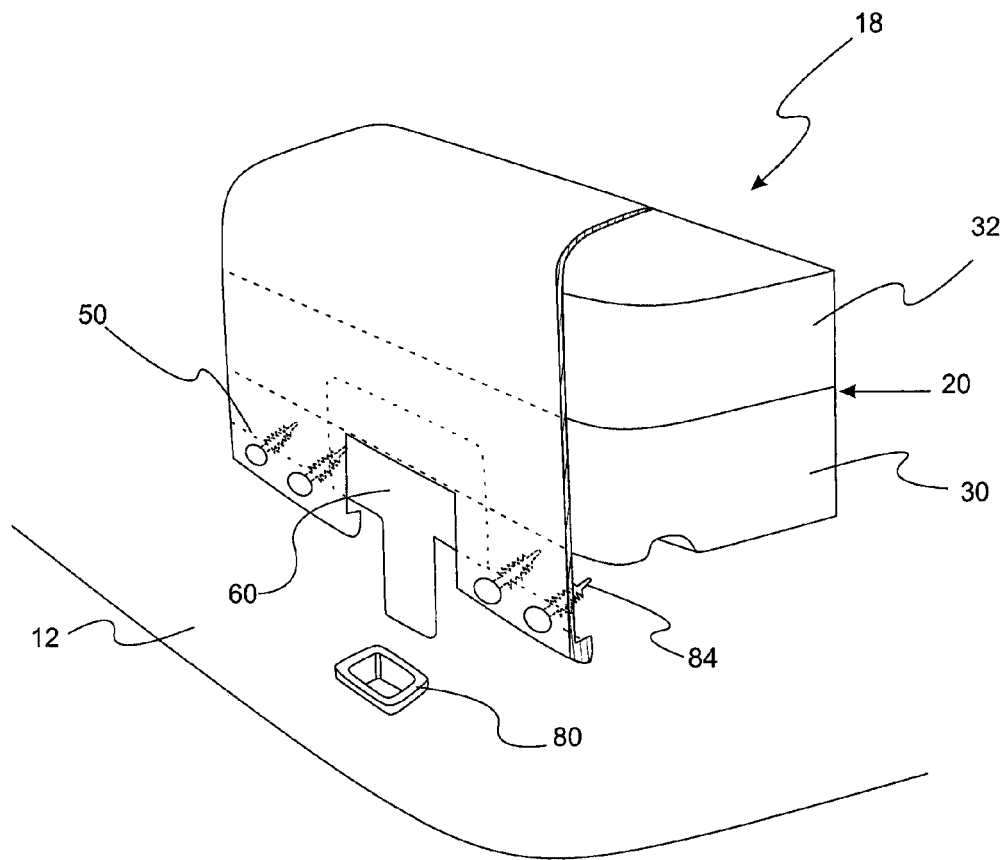
FIG. 5 is a view similar to FIG. 2 showing another embodiment.

The expanded polyolefin can be formed into the structural frame via any suitable forming process, such as exposing to steam in a mold, e.g., "steam chest molding". Making reference to FIG. 4, an exemplary method of forming the frame is illustrated. The polyolefin is provided, preferably by extrusion into mini pellets as shown in step 70, and later formed into beads as shown in step 72. The beads are then placed into the formed frame 30 in step 74. In this step, a molding tool 76 is provided and the beads are disposed therein. Steam is introduced into the tool 76 to cause the beads to adhere to each other and form the expanded polyolefin structural frame 30.

In at least one embodiment, the beads used to form the structural frame 30 have an average bead size of 0.5 to 8.0 mm, and in other embodiments of 1.0 to 6.0 mm.

The cushion 32 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574. In at least one embodiment, suitable cushion materials will have a hardness of 175 to 400 N/mm$^2$, in other embodiments of 225 to 350 N/mm$^2$, and in yet other embodiments of 275 to 325 N/mm$^2$. Hardness of the cushion can be measured by ASTM test method No. D3574. In at least one embodiment, suitable cushion materials will have a hysteresis of 18 to 30 KPa, in another embodiments of 20 to 28 KPa, and in yet other embodiments of 23-26 KPa. Hysteresis of the cushion material can be measured by ASTM test method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In other embodiments, the cushion material could be non-woven material, such as polyester, nylon or natural fibers. In at least one embodiment, because of its environmentally friendly nature, soy-based polyurethane is preferred. Any suitable soy-based polyurethane may be used, however in at least one embodiment, suitable soy-based polyurethanes include, but are not necessarily limited to those available from Lear and Renosol. The cushion 32 can be any suitable size and shape, however, in at least one embodiment, the cushion 32 has an average thickness of 20 to 100 mm, and in at least another embodiment of 30 to 70 mm, and in still yet other embodiments of 40 to 60 mm.

If a comfort pad is provided, it can comprise any suitable comfort layer or pad and can be made of any suitable material that provides good hand feel and soft resilience as the seat assembly 10 is deflected during use. A comfort pad is optionally provided when the cushion 32 has a density above 1.25 pcf, as measured according to ASTM test method No. D3574 and/or a hardness above 300 N, as measured according to ASTM test method No. D3574 at a compression of 50%. A comfort pad can comprise a sheet of relatively soft material, such as a low hardness foam or a pad of non-woven fibrous materials or a polyester, nylon, or natural non-woven fiber pad. It should be understood that the structural frame 30, the cushion 32, and, if present, the comfort pad can have any suitable configuration, shape and size.

As discussed above, the vehicle seat assembly 10 also includes trim material 22 which is adapted to engage the cushion composite 20 in a covering relationship. The trim material 22 may include any material known in the art. By way of example, some of the known materials include cloth, leather or polymers of sufficient quality and thickness for use in seat trim applications. Polymer trim materials may include a flexible close cell polymer skin material such as polyvinyl, polyvinyl chloride (PVC), polyester, nylon, thermoplastic olefin (TPO) or thermoplastic urethane (TPU). Additional materials for use as trim material 22, may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass, nylon, polyester or natural fibers may be applied to the foam backing or back of the trim material 22 for increase in strength without increasing rigidity.

The trim material 22 has a front end 50, adjacent the front end of the cushion composite 20, and a rear end 52, adjacent the rear end of the cushion composite 20. In at least the illustrated embodiment, the front end 50 of the trim material 22 has a front attachment bracket 60 thereon. While the bracket 60 can be secured in any suitable manner to the trim material 22, in at least the illustrated embodiment it is sewn thereto, via stitching 62. In at least the illustrated embodiment, the bracket 60 includes a generally planar face 64, secured to and aligned with the front end of the trim material 22, a downwardly depending flange 66 extending downward from the face 64, and a rearward depending leg 68. In at least one embodiment, the planar face 64 is 20 to 100 mm wide, 20 to 100 mm long, and 1 to 10 mm thick. In at least another embodiment, the planar face 64 is 30 to 80 mm wide, 30 to 80 mm long, and 2 to 7.5 mm thick. In at least one embodiment, the flange 66 is 10 to 25 mm wide, 20 to 40 mm long, and 1 to 10 mm thick. In at least another embodiment, the flange 66 is 1.25 to 20 mm wide, 25 to 35 mm long, and 2 to 7.5 mm thick. In at least one embodiment, the leg 68 is 10 to 40 mm wide, 20 to 100 mm long, and 1 to 10 mm thick. In at least another embodiment, the leg 68 is 15 to 30 mm wide, 30 to 80 mm long, and 2 to 7.5 mm thick.

In at least the illustrated embodiment, the rear end 52 of the trim material 22 has a rear attachment bracket 70 thereon. While the bracket 70 can be secured in any suitable manner to the trim material 22, in at least the illustrated embodiment it is sewn thereto, via stitching 72. In at least the illustrated embodiment, the bracket 70 includes a generally planar face 74, secured to and aligned with the rear end of the trim material 22, a rearwardly extending flange 76, and a forwardly extending flange 78. In at least one embodiment, the planar face 74 is 20 to 100 mm wide, 20 to 100 mm long, and 1 to 10 mm thick. In at least another embodiment, the planar face 74 is 30 to 80 mm wide, 30 to 80 mm long, and 2 to 7.5 mm thick. In at least one embodiment, the rearwardly extending flange 76 is 25 to 80 mm wide, 25 to 100 mm long, and 1 to 10 mm thick. In at least another embodiment, the rearwardly extending flange 76 is 30 to 70 mm wide, 35 to 80 mm long, and 2 to 7.5 mm thick. In at least one embodiment, the forwardly extending flange 78 is 10 to 40 mm wide, 20 to 100 mm long, and 1 to 10 mm thick. In at least another embodiment, the forwardly extending flange 78 is 15 to 30 mm wide, 30 to 80 mm long, and 2 to 7.5 mm thick.

In at least the illustrated embodiments, the shape of the brackets 60 and 70 provides a shelf capable of securing the frame to one or more of the attachment brackets, an area for securing (e.g., sewing) the bracket to the trim on the planar face, and a flange protruding through trim opening.

The brackets 60 and 70 can be made of any suitable material and by any suitable process. For instance, the brackets 60 and 70 can be made of a plastic, such as nylon, via an injection molding process. In other embodiments, the brackets 60 and 70 can be made of a relatively rigid natural material, such as hardened natural rubber or bamboo.

In the illustrated embodiment, the vehicle floor pan 12 is illustrated to have corresponding recesses 80 for receipt of the front flange 66 of the trim material 22 for securing the trim material 22, and thus the seat assembly 10, to the vehicle. The front bracket 60 helps to prevent forward slippage and/or upward lift of the seat assembly 10 during normal use and in impact. The front attachment flange 66 can be secured within the recess 80 in any suitable manner. Some exemplary suitable attachment manners include, among others, via an interference fit, adhesive, clips, etc. As shown in the illustrated embodiment, the rear attachment bracket 70 can be disposed within a slot 82 in the pan 12 for additional stability. The rear bracket 70 helps to stabilize the seat assembly 10 on the floor pan 12 and assists in retention when pulled upward during frontal impacts. However, it should be understood that the rear slot 82 could be omitted so that the rear attachment bracket 70 are secured to the vehicle floor pan 12 in another manner, or could just rest on the floor pan. Moreover, the rear attachment brackets 70 could even be omitted such that the front attachment bracket 60 is the only, or primary component for securing the frame 30 to the vehicle.

In at least the illustrated embodiment, the recess 40 in the frame 30 has a bar 42 disposed therein and the front end of the trim material 22 includes J-shaped okie strips 46 that are securable to the bar 42 for supporting the trim material on the seat frame 30. However, it should be understood that the illustrated bar 42 and/or okie strips 46 could be omitted. In such cases, other attachment means could secure the trim material 22 to the frame 30 and/or seat assembly. For instance, the trim material 22 could have Christmas tree fasteners 84 which could be pushed into the frame 30, such as at recess 40.

In at least certain embodiments, the frame 30, the cushion 32, if present, the comfort pad, and the trim material 22 are configured so that they can be easily assembled and disassembled to facilitate assembly and end of line disassembly for recycling. In at least one embodiment, the frame 30 and the cushion 32 are not secured to each other by any suitable mechanical fastening. In this embodiment, the cushion 32 is placed over the frame 30 and both are held together by the overlying trim material 22. In other embodiments, the frame 30 and cushion 32 can have mechanical fastening components, such as adhesive and/or clips, to hold onto each other.

In keeping with the environmentally friendly considerations of the vehicle seat assembly 10, any adhesive layer that is used should be compatible with one or more of the frame 30 and cushion 32 for ease of recycling. For example, a polyester-based adhesive can be used to adhere polyester trim 22 to a non-woven polyester cushion 32 thereby maintaining common polymer content in that layer. Similarly if attachment clips are used in a polyurethane cushion 32, they could be molded out of thermoplastic polyurethane (TPU) to again preserve commonality of polymer content in the layer. When separated, the TPU clips could remain in the support polyurethane layer.

As discussed above, the vehicle seat assembly 10 of the present invention is readily recyclable. In this regard, the frame 30 and cushion 32 can be easily separated from each other and from the trim material 22 in a relatively easy and straightforward fashion. For instance, the frame 30 and cushion 32 can be separately recycled without any difficulty and recycled in separate streams.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly securable to a floor pan having at least a first attachment receptacle and a second attachment receptacle, said vehicle seat assembly comprising:
    a seat bottom supportable on the floor pan, the seat bottom including a structural foam frame supportable directly on the floor pan and a flexible foam seat cushion supported directly on the frame, the frame having an average thickness of 20 to 400 mm; and
    a trim cover engagingly cooperable with the floor pan to enable the trim cover to be securable over the seat bottom and to the floor pan, the trim cover having a front end, a rear end, a first attachment bracket securable to a first attachment receptacle of the floor pan, and a second attachment bracket securable to a second attachment receptacle of the floor pan, the first attachment bracket being disposed on the front end of the trim cover and the second attachment bracket being disposed on the rear end of the trim cover, the first attachment bracket comprising a first planar face aligned with the front end of the trim cover and a downwardly depending flange extending downwardly from the first planar face and being securable to the first attachment receptacle, wherein the first and second attachment brackets are sized to provide an interference fit with the first and second attachment receptacles, respectively and wherein the first attachment receptacle comprises a recess in the floor pan.

2. The vehicle seat assembly of claim 1, wherein the trim cover is made of a textile material and the first and second attachment brackets are made of a relatively rigid plastic.

3. The vehicle seat assembly of claim 1, wherein the attachment brackets are secured to the trim cover.

4. The vehicle seat assembly of claim 1, wherein the attachment brackets are sewn to the trim cover.

5. The vehicle seat assembly of claim 1, wherein the trim cover has a third attachment bracket secured to the seat bottom.

6. The vehicle seat assembly of claim 5, wherein the third attachment bracket is made of a relatively rigid plastic.

7. The vehicle seat assembly of claim 5, wherein the first, second and third attachment brackets are made of rigid plastic.

8. The vehicle seat assembly of claim 1, wherein the structural foam comprises expanded polyolefin.

9. The vehicle seat assembly of claim 1, wherein the first attachment bracket further comprises a leg that depends rearwardly from the first planar face.

10. The vehicle seat assembly of claim 1, wherein the second attachment bracket comprising a second planar face aligned with the rear end of the trim cover and a forwardly extending flange extending forwardly from the second planar face and securable to the second attachment receptacle.

11. The vehicle seat assembly of claim 9, wherein the second attachment bracket comprising a second planar face aligned with the rear end of the trim cover and a forwardly extending flange extending forwardly from the second planar face and securable to the second attachment receptacle.

12. The vehicle seat assembly of claim 11, wherein the trim cover has a third attachment bracket secured to the seat bottom.

13. A vehicle comprising:
    a vehicle floor pan having a front attachment receptacle and a rear attachment receptacle;
    a seat frame made of structural foam disposed on the floor pan, the seat frame having a recess and a bar disposed within the recess;
    a foam cushion disposed over the seat frame; and
    a textile trim cover disposed over the seat cushion, the trim cover secured to the floor pan and to the recess of the seat frame, the trim cover having a first attachment bracket secured to the first attachment receptacle of the floor pan, the first attachment bracket being made of plastic and the seat frame being made of EPP, the trim cover further comprising a J-hook secured to the bar within the recess.

14. The vehicle of claim 13, wherein the trim cover has a second attachment bracket securable to the second attachment receptacle of the floor pan, the first attachment bracket being disposed on a front end of the trim cover and the second attachment bracket being disposed on a rear end of the trim cover.

15. The vehicle of claim 14, wherein the first and second attachment brackets are sized to provide an interference fit with the first and second attachment receptacles, respectively.

16. A method of securing a vehicle seat assembly to a floor pan having at least a first attachment receptacle and a second attachment receptacle, said method comprising:
    providing a seat bottom comprising a seat frame and a cushion supported on the seat frame;
    disposing a trim cover over the seat bottom, the trim cover having a front end and a rear end, the trim cover further having a first attachment bracket configured to be securable to the first attachment receptacle of the floor pan via an interference fit and a second attachment bracket configured to be securable to the second attachment receptacle of the floor pan via an interference fit, the first attachment bracket being disposed on the front end of the trim cover and the second attachment bracket being disposed on the rear end of the trim cover, the first attachment bracket comprising a planar face aligned with the front end of the trim cover and a downwardly depending flange extending downwardly from the planar face;
    supporting the seat bottom on the floor pan; and securing the trim cover to the floor pan by (i) securing the downwardly depending flange of the first attachment bracket of the trim cover within the first attachment receptacle of the floor pan and (ii) securing the second attachment bracket of the trim cover within the second attachment receptacle of the floor pan.

17. The method of claim 16, wherein the trim cover is made of a textile material and has a first attachment bracket securable to a first attachment receptacle of the floor pan and a second attachment bracket securable to a second attachment receptacle of the floor pan, the first attachment bracket being disposed on a front end of the trim cover and the second attachment bracket being disposed on a rear end of the trim cover, the first and second attachment brackets being made of a relatively rigid plastic and sized to provide an interference fit with the first and second attachment receptacles, respectively.

18. The method of claim 16, wherein the first attachment bracket further comprises a leg that depends rearwardly from the first planar face.

19. The method of claim 18, wherein the second attachment bracket comprising a second planar face aligned with the rear end of the trim cover and a forwardly extending flange extending forwardly from the second planar face and securable to the second attachment receptacle.

20. The method of claim 16, wherein the second attachment bracket comprising a second planar face aligned with the rear end of the trim cover and a forwardly extending flange extending forwardly from the second planar face and securable to the second attachment receptacle.

* * * * *